United States Patent
McFarland et al.

(10) Patent No.: US 6,960,031 B2
(45) Date of Patent: *Nov. 1, 2005

(54) APPARATUS AND METHOD OF PACKAGING TWO DIMENSIONAL PHOTONIC ARRAY DEVICES

(75) Inventors: Jonathan McFarland, Phoenix, AZ (US); Suresh Golwalkar, Phoenix, AZ (US); Sampath K. V. Karikalan, Phoenix, AZ (US); Kevin J. Cote, Chandler, AZ (US); Wu Chun Chou, Chandler, AZ (US)

(73) Assignee: Primarion, Inc., Phoenix, AZ (US)

( * ) Notice: Subject to any disclaimer, the term of this patent is extended or adjusted under 35 U.S.C. 154(b) by 167 days.

This patent is subject to a terminal disclaimer.

(21) Appl. No.: 10/325,259

(22) Filed: Dec. 19, 2002

(65) Prior Publication Data

US 2004/0120658 A1 Jun. 24, 2004

(51) Int. Cl.[7] ............................... G02B 6/38; G02B 6/36
(52) U.S. Cl. ............................................ 385/89; 385/55
(58) Field of Search ................................ 385/55, 88, 89

(56) References Cited

U.S. PATENT DOCUMENTS

| | | | | |
|---|---|---|---|---|
| 3,950,075 A | * | 4/1976 | Cook et al. | 385/983 |
| 5,325,455 A | * | 6/1994 | Henson et al. | 385/89 |
| 5,631,988 A | * | 5/1997 | Swirhun et al. | 385/89 |
| 6,476,379 B2 | * | 11/2002 | Ando et al. | 250/227.11 |
| 2002/0114587 A1 | * | 8/2002 | Golwalkar et al. | 385/88 |

* cited by examiner

*Primary Examiner*—John D. Lee
*Assistant Examiner*—Tian M. Lin
(74) *Attorney, Agent, or Firm*—T. E. Galanthay

(57) ABSTRACT

An optical coupler for forming an optical connection between one or more two dimensional photonic array devices and an optical fiber and for forming an electrical connection between the two dimensional photonic array devices and a substrate, a system including the optical coupler and materials, and methods of forming the optical coupler and system are disclosed. The optical coupler includes a light transmission medium and electrical connectors, which are at least partially encapsulated. In addition, the device includes alignment guides configured to receive guide pins from a fiber optic connector, such that when the fiber optic connector is attached to the optical coupler, fibers of the ribbon align with the two dimensional photonic array device(s) via the light transmission medium.

25 Claims, 5 Drawing Sheets

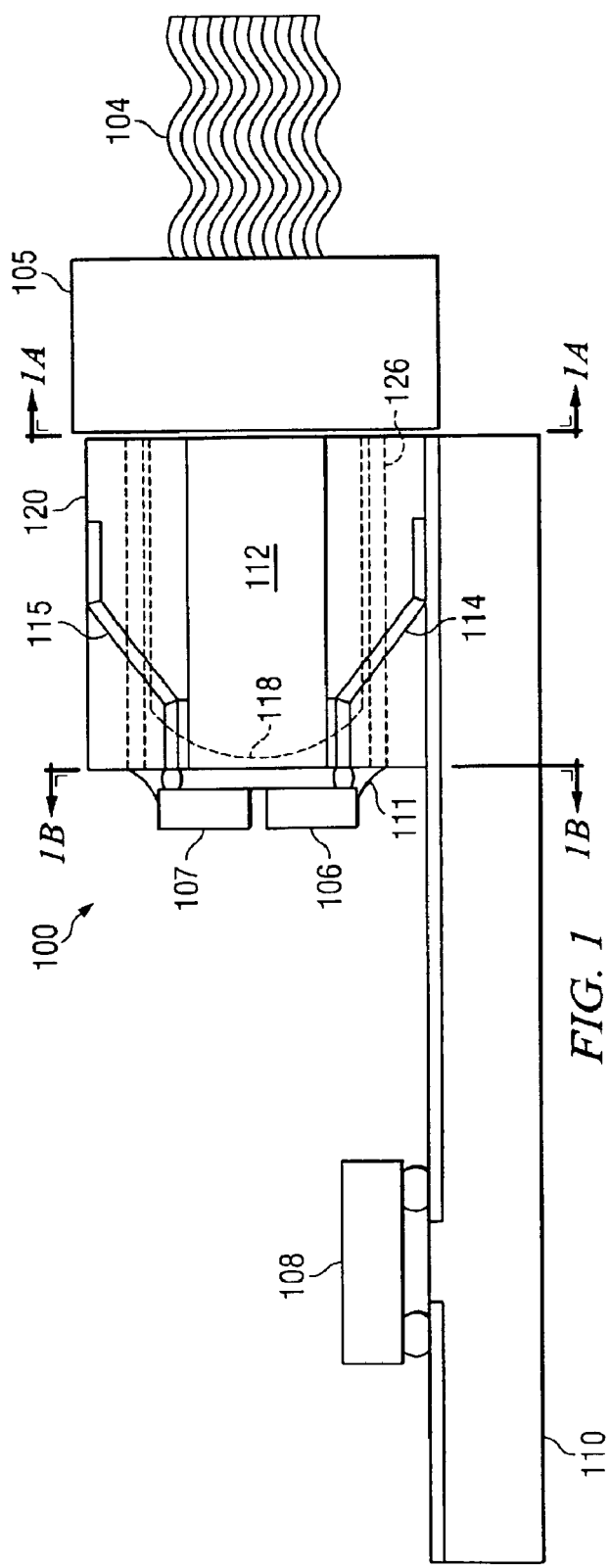
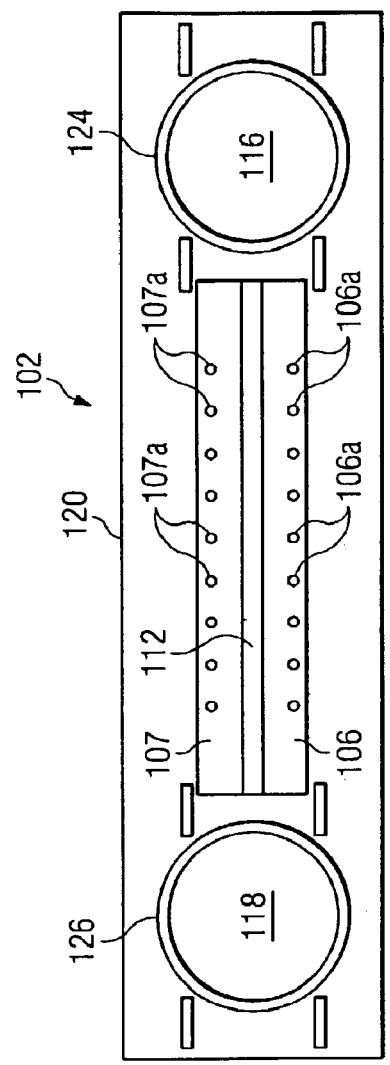
FIG. 1
FIG. 1A

APPARATUS AND METHOD OF PACKAGING TWO DIMENSIONAL PHOTONIC ARRAY DEVICES

CROSS REFERENCE TO RELATED APPLICATIONS AND PATENTS

1. U.S. patent application Ser. No. 09/911,918, entitled APPARATUS FOR COUPLING A FIBER OPTIC CABLE TO AN OPTOELECTRONIC DEVICE, A SYSTEM INCLUDING THE APPARATUS, AND A METHOD OF FORMING THE SAME in the name of Golwalkar et al., filed on Jul. 24, 2001.

2. U.S. patent application Ser. No. 10/056,757, entitled APPARATUS FOR COUPLING A OPTOELECTRONIC DEVICE TO A FIBER OPTIC CABLE AND MICROELECTRONIC DEVICE, A SYSTEM INCLUDING THE APPARATUS, AND A METHOD OF FORMING THE SAME, in the name of Golwalkar et al, filed on Jan. 23, 2002.

FIELD OF THE INVENTION

The present invention generally relates to the packaging of optoelectronic and microelectronic devices. More particularly, the invention relates to an apparatus and method of forming a package that includes two dimensional photonic array devices, integrated circuits, and alignment features for coupling to fiber optics or fiber optic systems.

BACKGROUND OF THE INVENTION

Fiber optic systems are often used to transmit information such as voice band and data across a network. Such systems include a light transmitting device (e.g., a laser) coupled to a first end of a fiber cable and a light receiving device (e.g., a photodetector) coupled to the other end of the cable; the light emitting and light receiving devices are collectively referred to as optoelectronic or photonic devices. In addition, the fiber optic system may also include an optical coupler to increase the efficiency of light transfer between the optoelectronic device and the fiber cable.

Various prior-art techniques and couplers have been developed to optically connect the fiber cable to an optoelectronic device. For example, couplers, including lenses to focus light emitted from a laser toward a fiber cable or from the cable toward a detector have been developed. Such systems generally require precise alignment of the optoelectronic device, the coupler, and the cable to achieve high-efficiency light transfer. The precision alignment techniques are typically labor intensive, manual, time consuming and expensive. Thus, improved optical couplers, which do not require or require less manual alignment between various components of the fiber optic system are desired.

Moreover, one dimensional optoelectronic arrays have their sensing/transmitting apertures arranged linearly. Thus, the amount of transferred information is limited by the number of apertures available along a single axis, e.g. the x axis. When such one dimensional optoelectronic arrays do not transmit as much information as desired, then additional arrays, typically in additional packages are required. However such additional packages add undesired bulk, cost, and may lack desired performance characteristics. Accordingly, improved techniques for coupling two dimensional photonic arrays, i.e. arrays where the number of apertures can be varied along both the x and y axes, without the typically manual, time consuming and expensive known precision alignment techniques as well as techniques for electrically connecting such two dimensional arrays to other microelectronic devices is desired.

SUMMARY OF THE INVENTION

The aforementioned failings of the prior art have been addressed and solved, in part, by the cross-referenced U.S. patent application Ser. No. 09/911,918, entitled APPARATUS FOR COUPLING A FIBER OPTIC CABLE TO AN OPTOELECTRONIC DEVICE, A SYSTEM INCLUDING THE APPARATUS, AND A METHOD OF FORMING THE SAME in the name of Golwalkar et al., filed on Jul. 24, 2001 and Ser. No. 10/056,757, entitled APPARATUS FOR COUPLING A OPTOELECTRONIC DEVICE TO A FIBER OPTIC CABLE AND MICROELECTRONIC DEVICE, A SYSTEM INCLUDING THE APPARATUS, AND A METHOD OF FORMING THE SAME, in the name of Golwalkar et al, filed on Jan. 23, 2002. These commonly assigned co-pending patent applications are hereby incorporated by reference.

The present invention further provides a package and method of forming a package that optically couples and self-aligns a fiber optic cable to a two-dimensional array of optoelectronic arrays (also know as photonic devices and photonic device arrays) and provides electrical connections to microelectronic circuits. The package is formed with equipment readily available in the microelectronic packaging art so that semiconductor chips can be readily attached to the same package substrate.

In accordance with one embodiment of the invention, a plurality of electrical connectors are created by bending standard leadframes. A waveguide is attached between at least a pair of these leadframes.

In accordance with manufacturing aspects of the invention, a long portion of a waveguide is attached between long sections of a pair of bent electrical connectors, e.g. lead frames.

In accordance with an aspect of the invention, a pair of alignment guides such as an alignment groove or sleeve is attached to (or formed into) the resulting subassembly. These alignment guides extend in a direction parallel to the direction that light waves are propagated and are adapted to receive guide pins provided on fiber optic connectors.

In accordance with the invention, this sub-assembly is then encapsulated and after encapsulation is then singulated into a plurality of discrete optical couplers.

In accordance with another aspect of the invention, at least one two dimensional photonic device array is attached, with electrical connections to the end surfaces of both the pair of electrical connectors, at one end of the optical coupler.

In accordance with another aspect of the invention, at least one fiber optic connector is pluggably attached at the other end of the optical coupler, such fiber optic connector having guide pins extending into the alignment sleeves.

In accordance with a further aspect of the invention, the package housing the optical coupler with the two dimensional photonic device array is attached to a substrate and electrical connections are formed between the substrate and both pairs of electrical connectors, e.g. leadframes.

In accordance with a still further aspect of the invention, other microelectronic devices are formed on the substrate with electrical connections to the two dimensional photonic device array via the pair of electrical connectors.

In accordance with another embodiment of the invention, two substrates are formed, each attached to one of the pair of electrical connectors.

In accordance with a specific aspect of the invention, the second substrate can be a flexible substrate direct connectable to the first substrate.

In accordance with another specific aspect of the invention, microelectronic devices can be mounted on one or both substrates.

BRIEF DESCRIPTION OF THE DRAWINGS

The present invention is illustrated by way of example and not limitation in the accompanying figures, in which like references indicate similar elements.

FIG. 1 is a cross-sectional illustration of a portion of an optical interconnect system in accordance with the present invention;

FIG. 1A is a sectional view of the FIG. 1 embodiment along section line A.

Those skilled in the art will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF EXEMPLARY EMBODIMENTS

Figure 1B:
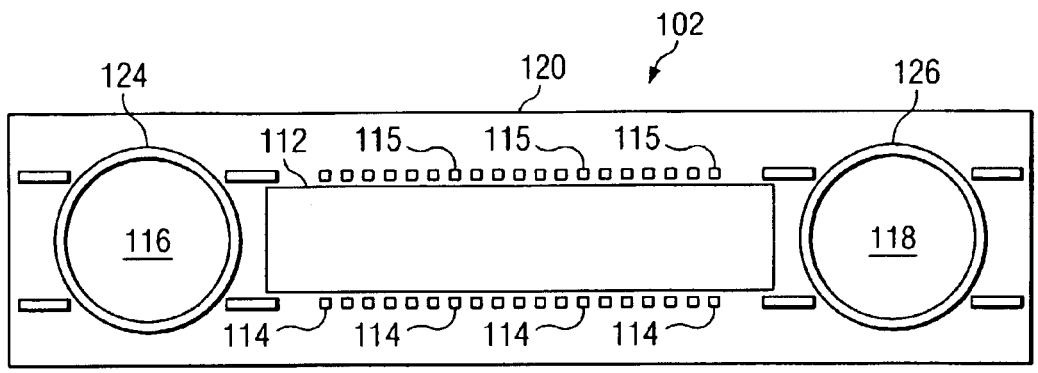
FIG. 1B is a sectional view of the FIG. 1 embodiment along section line B.

FIG. 1 illustrates a cross-sectional side view of an interconnect system 100 in accordance with one embodiment of the present invention. System 100 includes an optical coupler comprising an optical transmission medium, i.e. waveguide 112 attached between electrical connectors 114 and 115, and encapsulated in molding or potting compound 120. The optical coupler also includes alignment guides, such as sleeves or tubes 124 (see FIGS. 1A and 1B) and 126. System 100 may also include a fiber ribbon 104 attached to fiber optic connector 105, which typically includes pins 116 (see FIGS. 1A and 1B) and 118 adapted for insertion into sleeves 124 and 126, respectively. Two one dimensional photonic array devices 106 and 107 form a two dimensional photonic device array and are attached to the other side of the optical coupler, conveniently by soldering the electrical connections to the ends of electrical connectors 114 and 115. Gel 111 is dispensed between photonic device arrays 106 and 107 and the optical coupler to facilitate efficient light transfer between devices 106 and 107 and the waveguide 112 and to protect a portion of devices 106 and 107 and waveguide 112 from the environment. Gel 111 also contributes to the mechanical stability of the assembly. The optical coupler is attached to a substrate 110, for example by soldering the leads of electrical connector 114 to a conductive trace on substrate 110. A microelectronic device such as driver (or sensor) 108 to electrically drive (or sense) optoelectronic devices 106 and 107 is attached to substrate 110.

With continued reference to FIG. 1, refer now to FIG. 1A, which is an end view of FIG. 1, along section lines AA, illustrating the optical coupler 102. Optical coupler 102 is configured to facilitate forming an optical transmission path between an optical fiber of ribbon 104 and the two dimensional photonic array formed by devices 106 and 107, without requiring extensive, labor intensive adjustment of devices 106 and 107, or fiber ribbon 104. In other words, optical coupler 102 provides a "self-aligned" optical path between devices 106 and 107 and fiber ribbon 104. The self alignment feature is realized by using a fiber optic connector 105 having pins 116 and 118 adapted for insertion into sleeves 124 and 126. Alternatively, other types of aligned connections could be used. For example, the sleeves 124 and 126 could be replaced with protruding pins for insertion into aligned holes in fiber optic connector 105. In FIG. 1A, devices 106 and 107 are shown as seen through waveguide 112 and illustrating optical apertures 106A and 107A. Note the two dimensional arrangement of the apertures. Although two rows of apertures are shown in this example, the embodiment in accordance with this invention is completely scalable, permitting other size arrays as pointed out in greater detail hereinbelow.

With continued reference to FIGS. 1 and 1A, refer also to FIG. 1B, which is an end view of FIG. 1 along section lines BB. Corresponding elements including pins 116 and 118, sleeves 124 and 126, waveguide 112 and encapsulant 120 have been identified with corresponding reference numerals. In particular, note the end of electrical connectors 114 and 115. Photonic array device array 106 is attached, typically by solder connecting its conductive bumps to the ends of electrical connectors 114. Similarly, photonic array device 107 is attached to the ends of electrical connectors 115. Gel 111 is then applied by well known techniques.

Optical transmission medium 112 may be formed of any material that is transparent in the light wavelengths transferred between device 106 and 107 and fibers of ribbon 104. For example, medium 112 may be formed of a glass block, a fiber ribbon, a fiber tape, a holographic optical element, a cavity formed within encapsulant 120, a ferrule or any other suitable waveguide material or optical bus. In addition, beam steering can be provided by sticking a LINO3 crystal, liquid crystal, or hologram by a fused fiber faceplate or in place of a faceplate. In accordance with one embodiment of the invention, medium 112 includes a bundle of fused glass fibers, wherein each of the fibers has a core diameter that is less than the core diameter of a fiber of ribbon 104. For example, when the fibers of ribbon 104 (and the optical apertures of fiber optic connector 105 have a core diameter of about 50 to 125 micrometers ($\mu$m), the diameter of the fused fibers of medium 112 are preferably about 4 $\mu$m to about 10 µm. In accordance with another embodiment of the invention, medium 112 comprises optical elements configured to collimate and refocus light. Such optical elements are well suited for forming multiplexing and demultiplexing couplers.

Forming the transmission medium of fused fibers is advantageous because each fiber transmits light directly from one end of the fiber to the other, without dispersion of light. Thus, multiple optoelectronic devices 106 and 107 can be coupled to a single fused-fiber transmission medium and transmit or receive light to or from the medium, without interference from the light transmission of neighboring optoelectronic devices or fibers of ribbon 104. Furthermore, because the diameter of the individual fused fibers is less than the core diameter of a fiber of ribbon 104, it is relatively easy to assemble system 100, such that an optical path between optoelectronic devices 106 an 107 and the fiber of ribbon 104 (or ribbons 104 if multiple ribbons and fiber optic connectors 105 are used) is in alignment. For example, such a scheme enables the coupling of light between optoelectronic devices and receivers or detectors.

The dimensions of transmission medium 112 may vary from application to application and depend on such factors as the configuration of the photonic array device, the composition of the transmission medium and the like. However, in accordance with one embodiment of the invention, medium 112 includes fused fibers and has overall dimensions of about 3.1 mm wide, about 450 micron high, and about 2 mm long (along the length of the fused fibers).

When used, electrical connectors 114 and 115 provide a conductive path between optoelectronic devices 106 and 107 and substrate 110 to form a conductive path between, for example, driver 108 and photonic array devices 106 and 107. Alternatively, it is not necessary for connectors 114 and 115 to extend all the way to section line AA. As explained in greater detail below, connectors 114 and 115 may be formed from a sheet or plate of conductive material by patterning and forming or bending the conductive material, as in a leadframe, or from a microelectronic substrate having conductive layers formed therein, to eventually form a conductive path. Connectors 114 and 115 could also be wire bonds. This arrangement of photonic devices 106 and 107 in a plane perpendicular to the direction of optical propagation provides an effective ninety degree bend in the direction of the overall (i.e. optical and electrical) signal propagation. The effective ninety degree electrical bend is advantageous because several photonic array devices such as vertical cavity surface emitting lasers (VCSELs) emit light in the direction of the surface upon which electrical contacts of the device are formed. With several prior art optoelectronic coupler systems, the VCSEL is bonded directly to the substrate 110 and the light is bent ninety degrees using relatively complicated and expensive optical couplers. The two dimensional array provided by devices 106 and 107 can be advantageously utilized to have light transmitters, e.g. VCSELs in one of the devices and light sensors, e.g. photo detectors in the other. By mounting the photonic array devices perpendicular to the direction of wave propagation in the waveguide, the need for ninety degree light bending is eliminated.

Electrical connectors are generally configured such that when photonic array devices 106 and 107 are coupled to coupler 102, the light output or input section of device 106 and device 107 is aligned with medium 112 and to a desired fiber of ribbon 104. The spacing and dimensions of electric connectors 114 and 115 is often determined by the photonic array devices attached to the connectors. In accordance with one embodiment of the invention, connectors 114 and 115 are formed of a conductive metal plate (e.g., copper) having a thickness of about 70 µm and are spaced about 125 µm apart. Connectors 114 and 115 may also include additional material such as gold to facilitate bonding to optoelectronic devices 106 and 107 and solder material to facilitate bonding to substrate 110.

Guides 124 and 126 are generally configured to facilitate alignment between coupler 102 and fiber ribbon 104, typically by way of fiber optic connector 105. In particular, guides 124 and 126 are designed to receive pins or protrusions fiber optic connector 105, such that the fibers of ribbon 104 align with medium 112 and to photonic array devices 106 and 107. In accordance with one embodiment of the invention, fiber optic connector 105 includes guide pins 116 and 118 as are typically found on MT series of fiber connectors 105, and guides 124 and 126 are formed of tubes 124 and 126, which eventually form cavity regions within encapsulant 120. Tubes 124 and 126 may be formed of any suitable material. For example, tubes 124 and 126 may be formed of molded plastic or conductive material such as stainless steel. Alternatively, a portion of electrical connectors 114 and/or 115 could be bent and configured into a shape suitable for use as guides.

Encapsulant 120 is generally configured to provide insulation between portions of connectors 114 and 115 and to provide a protective environment around waveguide 112 and at least a portion of connectors 114 and 115. Exemplary encapsulant 120 materials include transfer mold compound, ceramic material, encapsulating epoxy and other suitable materials. In accordance with one embodiment of the invention, encapsulant 120 is formed of silica-filled epoxy. In accordance with another embodiment, encapsulant 120 includes Glob Top.

Gel 111 may include any suitable optically transparent material. In accordance with one embodiment of the invention, gel 111 includes a clear organic material having an index of refraction that is "index matched" to the index of refraction of transmission medium 112 and to a portion of the photonic array device. In this context, "indexed matched" means that the index of refraction of material 111 is the same as the index of refraction of either transmission medium 112 or a portion of the photonic array device, or the index refraction of gel 111 is between the index of refraction of the transmission medium 112 and a portion of the photonic array device. Those skilled in the art will recognize that gel 111 can be a polymer, either thermoset or thermoplastic and is not restricted to partially cross-linked gel material.

Optoelectronic or photonic devices 106 and 107 may include any suitable light emitting or light detecting device. For example, device 106 may include light emitting devices such as a light emitting diode, an edge emitting laser, a VCSEL, a distributed feedback laser, a distributed Bragg reflective light source, or the like and device 107 can be configured similarly or to complement the functions of 106. The light emitting devices may emit light of one or more wavelengths. If device 106 or 107 is a light detecting device, it may include a photo detector such as reversed-biased pn junction diodes, p-i-n diode, metal-semiconductor-metal (MSM) detector, a resonant cavity enhanced detector, a liquid crystal display, or the like. Devices 106 and 107 may be discrete components or assembled in a one dimensional (1-D) or two dimensional (2-D) array. Furthermore, devices 106 and 107 may be configured to emit or detect light of any desired wavelength; however, they are preferable designed to emit or detect light of one or more wavelengths in the mid infrared to and including the visible radiation spectrum. Substrate 110 may include any suitable material. Exemplary substrate materials include FR-4 printed circuit board materials, ceramic materials, flexible substrates, silicon, and the like.

Figure 2:
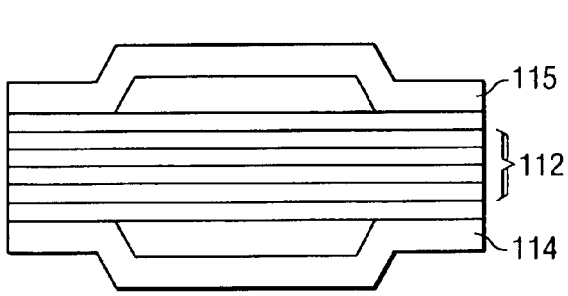
FIG. 2 is a cross-sectional view of a partially manufactured package housing an optical coupler in accordance with the present invention.

Refer now to FIG. 2, illustrating the invention at an early stage of manufacture. Corresponding elements have been identified with reference numerals corresponding to the same elements in other drawing figures. Electrical connectors 114 are leadframes, usually copper, of the type normally used in the packaging of semiconductor chips. They have been bent to the illustrated shape by well known manufacturing apparatus. Optical transmission medium 112 forming waveguide 112 is made from fused glass fibers or any of the alternatives previously described such as fused fiber faceplates, fiber bundles, etc. Alignment guides 124 and 126 (not shown) and waveguide 112 are positioned above the first leadframe 114 and attached with an adhesive organic material (not shown). Alternatively, these elements are held in place with fixturing tools in the mold press. Depending on the accuracy of the equipment being used, the leadframe 115 is placed on the top of the alignment guides 124 and 126 (not shown) for increased accuracy. One could directly attach the leadframe 115 to the top of the waveguide 112, but the accuracy of the waveguide would have to be tightly controlled and may be cost prohibitive. The second lead frame 115 could also be held above both the alignment guides 124 and 126 (not shown) with fixturing tools or adhesively attached to the waveguide and/or alignment guides 124 and 126 (not shown) for the molding process.

Figure 3:
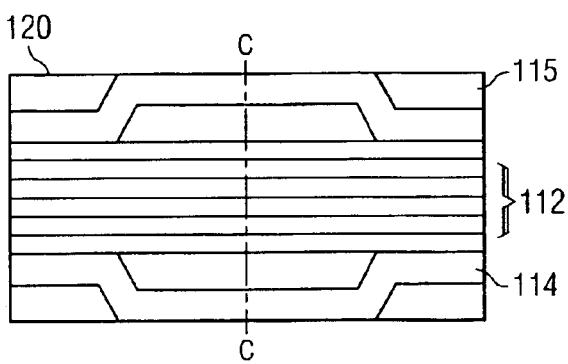
FIG. 3 is a cross-sectional illustration of the FIG. 2 embodiment after encapsulation.

Refer now to FIG. 3 which shows the assembly encapsulated with molding or potting compound 120 (e.g. a silica-filled epoxy material). In practice, the assembly would be much longer, i.e. extended to the right and left of the illustration. In this way, a plurality of optical couplers can be assembled and molded at once to make the angle placement and alignment of the sleeves and waveguide easier to manufacture. Making these in a MAP (molded array package) format would also decrease the cost for volume manufacturing.

Figure 4:
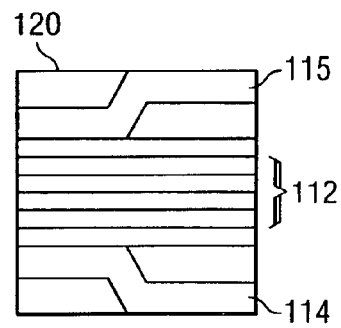
FIG. 4 is a cross-sectional illustration of the FIG. 3 embodiment after singulation.
Figure 5:
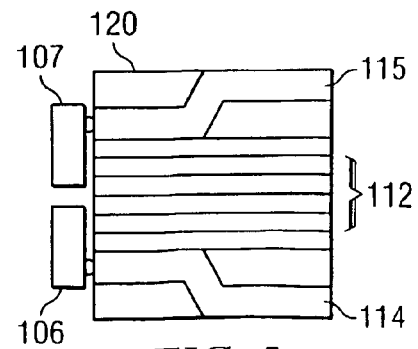
FIG. 5 is a cross-sectional illustration of the FIG. 4 embodiment illustrating the attachment of photonics device arrays.

Refer now to FIG. 4, illustrating the singulated individual optical coupler after it has been sliced along line CC (in FIG. 3). At this point, the left and right ends of the package are polished to insure a flat surface. As then illustrated in FIG. 5, photonic array devices 106 and 107 are attached, most conveniently using well-known flip-chip attach methods. The chips are placed within +/−5 um tolerance using commercially available flip chip bonders. After attaching the photonic chips 106 and 107, a transparent polymer material e.g. gel 111 is dispensed between the chip and the polished face of waveguide 112 to provide the aforementioned functions including mechanical strain relief, mechanical support, and/or index matching. Subsequent processes involve attaching this optical coupler assembly to a substrate and then attaching the supporting chips (laser drivers, transimpedance amplifier (TIA)/limit amp, serial deserializer circuits (SERDES), discretes, etc.) adapted to be placed into a system environment.

Figure 5A:
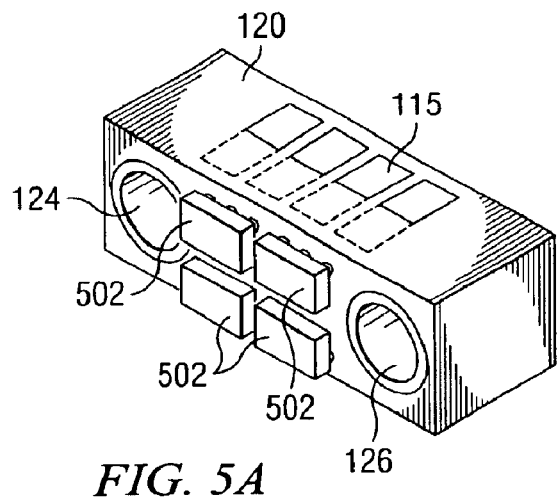
FIGS. 5A, 5B, 5C, and 5D are isometric views of alternative embodiments illustrating the attachment of photonics device arrays.
Figure 5B:
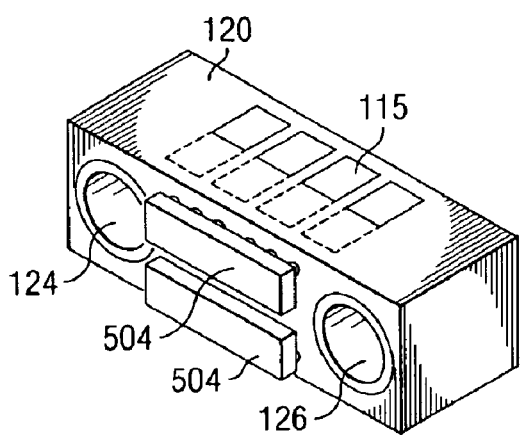
Figure 5C:
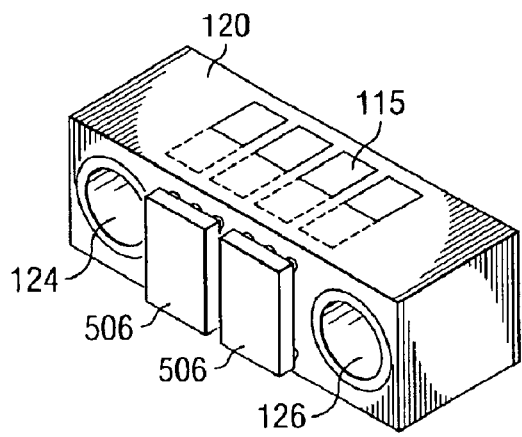
Figure 5D:
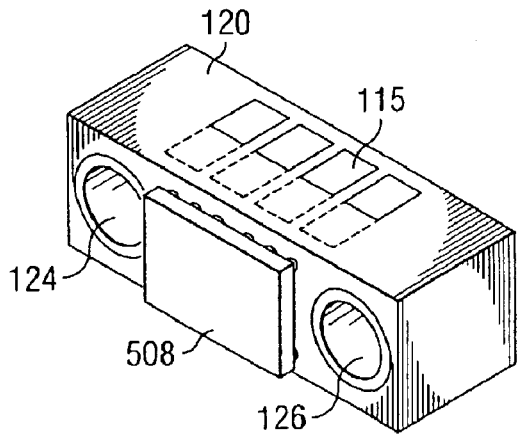

Refer now to FIGS. 5A–5D, illustrating alternate arrangements of attaching photonic array devices to the optical coupler 102. FIGS. 5A–5B illustrate at least two one dimensional arrays packaged in accordance with the invention. FIG. 5A shows four individually attached 1×4 array photonic devices 502. FIG. 5B shows two individually attached 1×12 array photonic devices 504. FIG. 5C shows two individually attached 2×3 array photonics devices 506. FIG. 5D shows one 2×12 array photonics device 508. Thus, in accordance with the present invention, at least one two dimensional photonic device or at least two one dimensional photonic devices are packaged. Electrical connector 115 is shown partially embedded in encapsulant 120.

Figure 6:
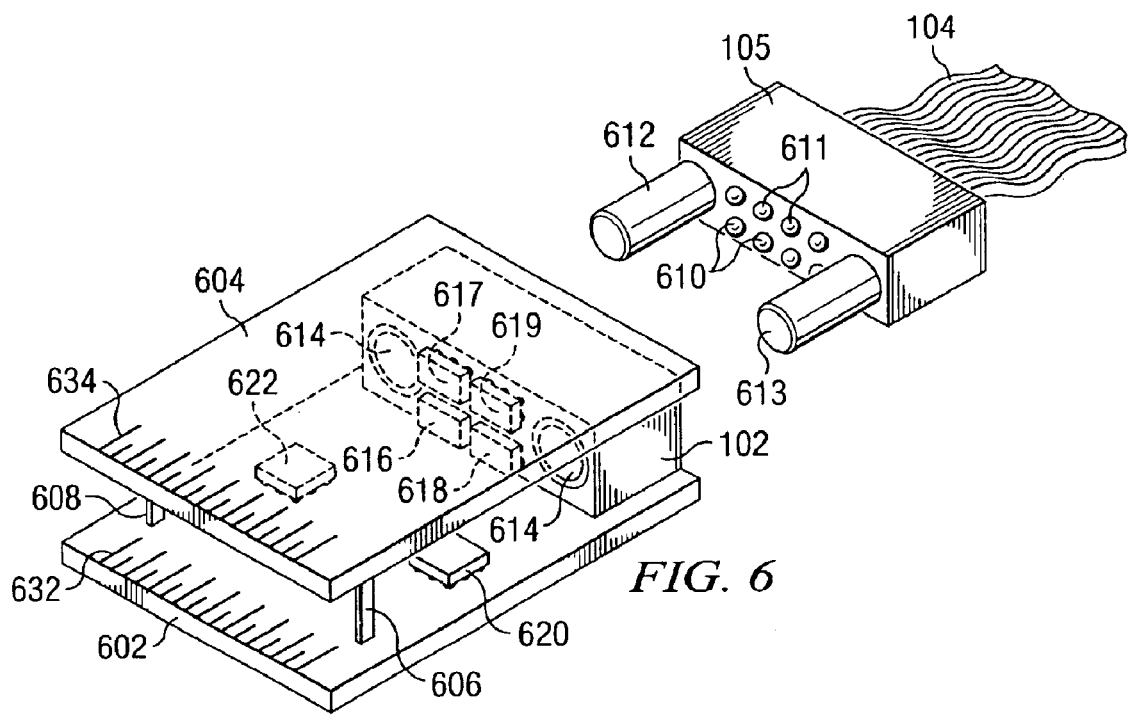
FIG. 6 is an illustration of the package housing the optical coupler, with two substrates in accordance with one embodiment of the present invention.

Refer now to FIG. 6 showing the optical coupler 102 in a higher level package assembly. The optical coupler 102 is attached between lower substrate 602 and upper substrate 604, such as conventional printed circuit boards. The two boards are connected together by stand-offs 606 and 608. A pluggable fiber optic connector 105 is pluggable into coupler 102. Coupler 105 is attached to fiber optic ribbon 104 on one side and provides an optical interface through apertures 610 and 611 on the other side. Pins 612 and 613 are inserted into alignment guides 614, such that apertures 610 and 611 are guided against optical coupler 102. The individual optical fiber interfaces 610 and 611 are much larger than the individual light transmission channels in the optical medium of optical coupler 102, reducing the criticality of precise alignment. Photonic devices 616, 617, 618 and 619 are attached to the other side of optical coupler 102. Microelectronics devices 620 and 622 are attached to the lower substrate 602. Substrate 602 has edge connector 632 for additional electrical connection and substrate 604 has edge connector 634 for additional electrical connection to a system.

Figure 7:
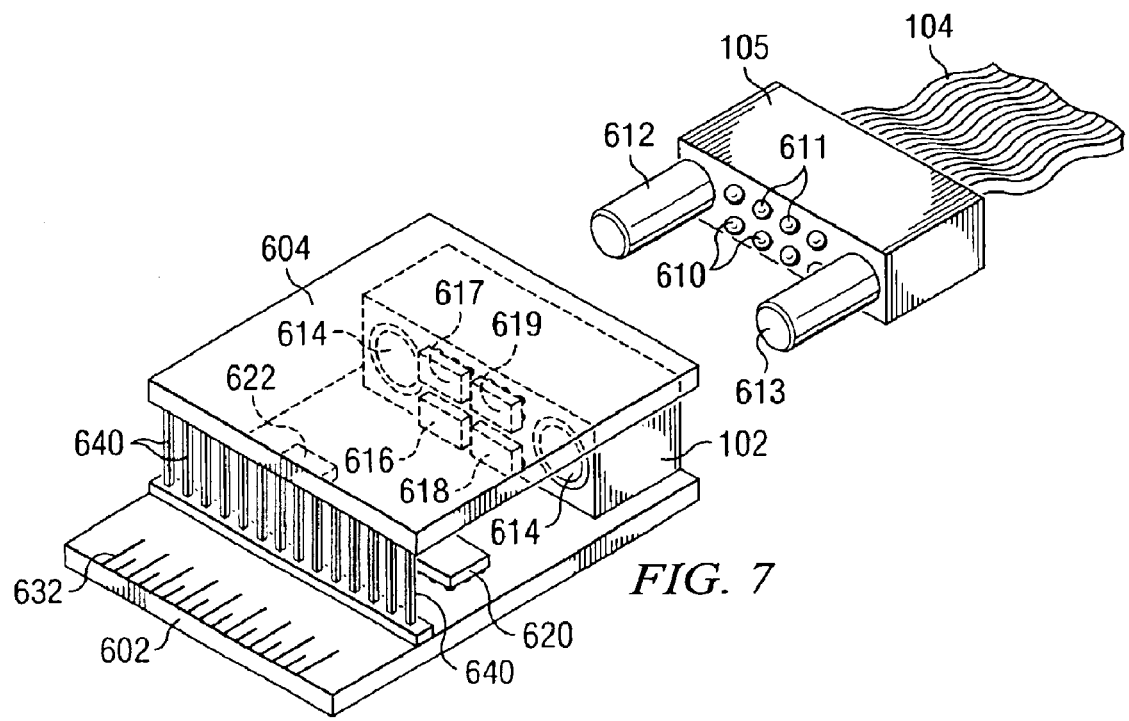
FIG. 7 is an illustration of the package housing the optical coupler with two substrates and exemplary electrical connections in accordance with another embodiment of the present invention.

Refer now to FIG. 7, which is a modification of the FIG. 6 embodiment. Corresponding elements have been identified with corresponding reference numerals. In the FIG. 7 embodiment, electrical connection between substrates 602 and 604 is by pins 640. In this way, a single edge connector 632 provides electrical connection to other portions of a system.

Figure 8:
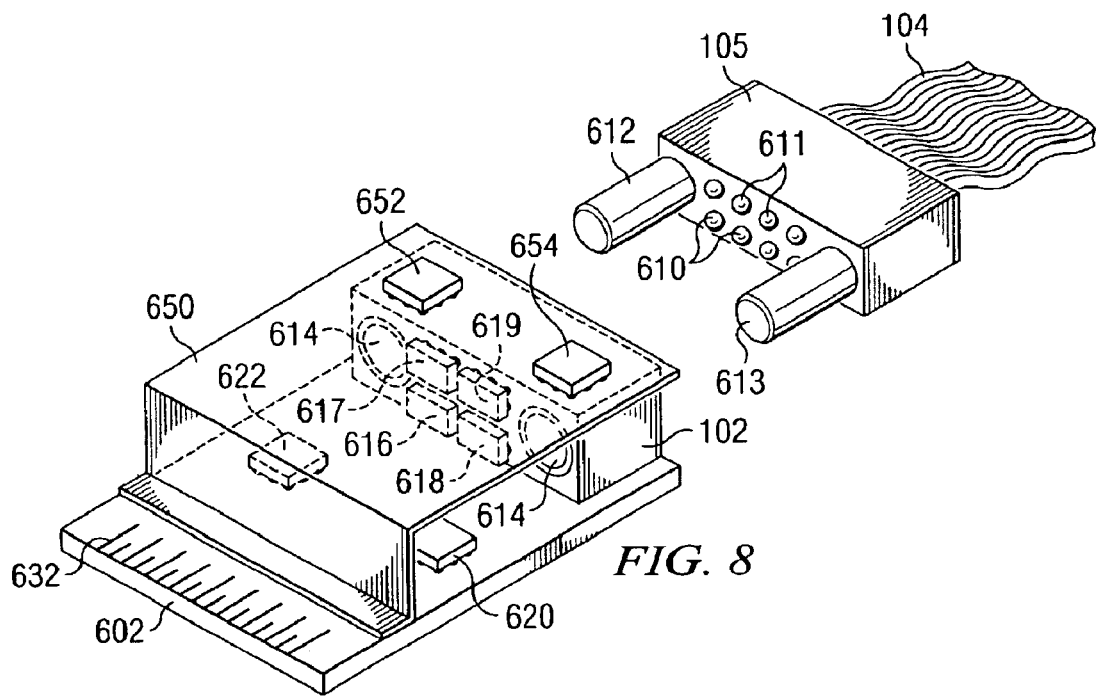
FIG. 8 is an illustration of the package housing the optical coupler in accordance with another embodiment of the present invention.
Figure 9:
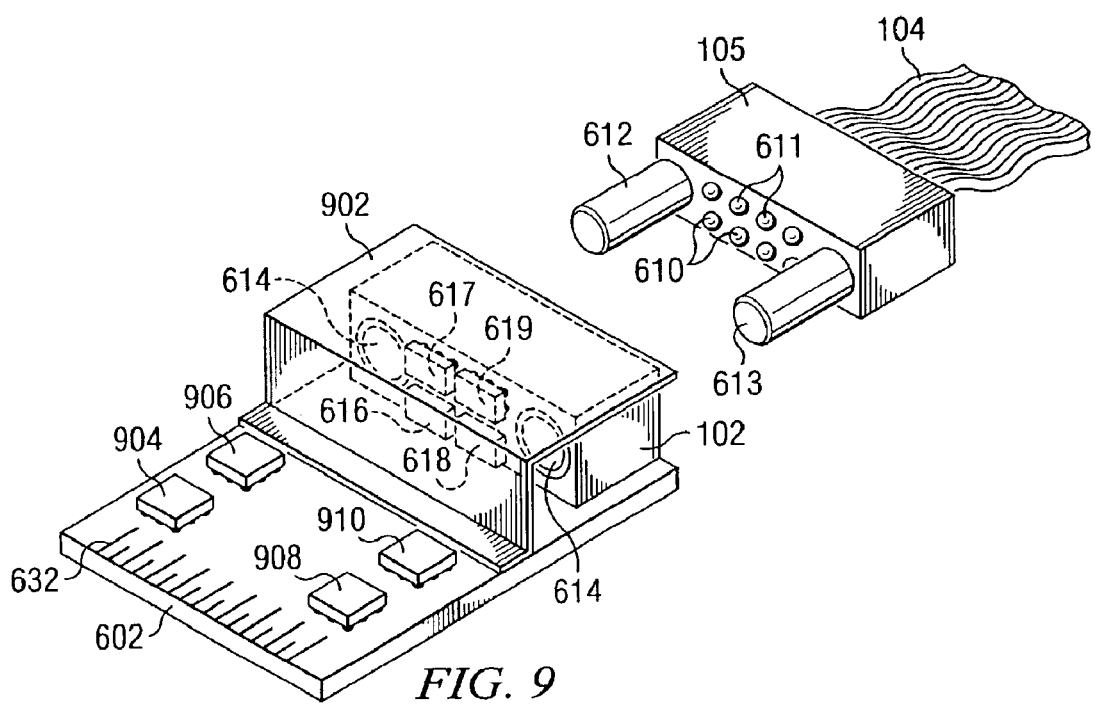
FIG. 9 is an illustration of the package housing the optical coupler in accordance with still another embodiment of the present invention.

Refer now to FIG. 8, which is a further modification of the FIG. 7 embodiment. Corresponding elements have again been identified with corresponding reference numerals. In the FIG. 8 embodiment, the second substrate 650 is a flex tape or leadframe material that can be bent and formed to establish electrical connection from the upper lead frame of the optical coupler to substrate 602. This permits further electrical connections with a single edge connector 632. Also microelectronic devices can be connected to substrate 650, e.g. by flip chip connection techniques. Of course, substrate 602 can also be connected to a higher level package by flip chip techniques instead of edge connector 632. The embodiment of FIG. 9 is similar to the FIG. 8 embodiment, except that the flexible upper substrate 902 is connected to substrate 602 closer to optical coupler 102. Microelectronic devices 904, 906, 908, and 910 are not positioned under the upper substrate 902.

With respect to all of the embodiments, it should be noted that after fiber optic connector 105 is plugged into the optical coupler, it can be further secured with a strap or clip to assure that it remains plugged. Such a strap or clip would also provide strain relief. Also, the optical coupler of this invention has been described in the context of a waveguide and two leadframes, those skilled in the art will recognize that additional leadframes could be positioned at other surfaces of the waveguide; which in turn could have a cross-section that is not rectangular, e.g. a polygon, ellipse or circle. Furthermore, although two alignment guides have been illustrated, it may be desired to use additional alignment guides, or even a more complex connector. The cross sectional shape of the alignment guide does not have to be round and therefore even a single alignment guide could provide the desired function. As was previously noted, the male and female portions of the connector could be interchanged either completely or partially.

While the present invention is set forth herein in the context of the appended drawing figures, it should be appreciated that the invention is not limited to the specific form shown. For example, the optical coupler of the present invention may be scaled to accommodate any number of optoelectronic devices and fibers from a ribbon. Various other modifications, variations, and enhancements in the design and arrangement of the method, apparatus, and system set forth herein, may be made without departing from the spirit and scope of the present invention.

What is claimed is:

1. A method of forming an optical coupler, comprising the steps of:

creating a plurality of electrical connectors;

positioning a waveguide among said plurality of electrical connectors;

encapsulating at least a portion of the electrical connectors and at least a portion of the waveguide, and singulating.

2. The method of forming an optical coupler as in claim 1, further comprising:

forming at least one alignment guide.

3. The method of forming an optical coupler as in claim 2, wherein the step of forming an alignment guide comprises:

bending a portion of a conductive plate to form a conduit.

4. The method of forming an optical coupler as in claim 1, wherein the step of creating a pair of electrical connectors comprises:

providing a leadframe and bending the leads.

5. The method of forming an optical coupler as in claim 1, wherein the step of creating electrical connectors comprises:

patterning a surface of a plate of conductive material, etching the plate of conductive material to form conductive leads, and bending the conductive leads.

6. The method of forming an optical coupler as in claim 1, further comprising:

attaching an alignment guide to a portion of at least one of the said plurality of electrical connectors.

7. The method of forming an optical coupler as in claim 1, further comprising:

attaching an alignment guide to a portion of said waveguide.

8. The method of forming an assembly with an optical coupler creating the steps of:

creating a plurality of electrical connectors;

positioning a waveguide among said plurality of electrical connectors; and encapsulating at least a portion of the electrical connectors and at least a portion of the waveguide;

wherein said plurality of electrical connectors is a pair of leadframes, further comprising:

electrically connecting at least one two dimensional array of photonic devices to the ends of said pair of leadframes.

9. The method of forming an assembly with an optical coupler as in claim 8 wherein the step of electrically connecting comprises:

soldering the two dimensional array of photonic devices to the ends of said pair of leadframes in a plane substantially perpendicular to the plane of at least one of said leadframes.

10. The method of forming an assembly with an optical coupler as in claim 9, further comprising:

forming electrical connections between portions of the first and second ones of said pair of leadframes.

11. The method of forming an assembly with an optical coupler as in claim 10, wherein the step of forming electrical connections is by means of a plurality of flexible conductors.

12. The method of forming an assembly with an optical coupler as in claim 9 further comprising:

attaching substrates to said pair of leadframes.

13. The method of forming an assembly with an optical coupler as in claim 9 further comprising:

connecting said planar substrates with electrically conducting pins.

14. The method of forming an assembly with an optical coupler as in claim 12 further comprising:

attaching a microelectronic component to at least one of said pair of substrates.

15. The method of forming an assembly with an optical coupler as in claim 12 further comprising:

providing an edge connector to at least one of said pair of substrates.

16. The method of forming an assembly with an optical coupler as in claim 9 further comprising:

plugging an array of optical fibers opposite to the two dimensional array of photonic devices.

17. The method of forming an assembly with an optical coupler as in claim 8, wherein said at least one two dimensional array of photonic devices comprises two one dimensional photonic arrays.

18. The method of forming an assembly with an optical coupler as in claim 8, wherein said at least one two dimensional array of photonic devices comprises an integrated two dimensional photonic array.

19. An optical coupler comprising:

a waveguide, a plurality of electrical connectors at least partially surroundings said waveguide;

an encapsulant surrounding at least portions of said waveguide and said plurality of electrical connectors; and a two dimensional photonic arrary attached to the plurality of electrical connectors in a plane substantially perpendicular to the direction of propagation in said waveguide.

20. An optical coupler as in claim 19 further comprising:

a fiber optic connector attached to said optical coupler wherein said fiber optic connector has at least one alignment protrusion adapted to be inserted into said alignment guide.

21. An optical coupler as in claim 19 wherein said alignment guide is adapted to be coupled to a fiber optic connector.

22. An optical coupler as in claim 19 wherein said two dimensional photonic array comprises:

at least one two dimensional photonic array device.

23. An optical coupler as in claim 19 wherein said two dimensional photonic array comprises:

at least two one dimensional photonic array devices.

24. An optical coupler as in claim 19 further comprising:

at least one alignment guide arranged in parallel with the direction of propagation in said waveguide.

25. An optical coupler as in claim 19 wherein said alignment guide is a hollow sleeve.

* * * * *